INVENTOR.
Mark L. Goldberg
BY B. Gordon Allen

United States Patent Office 2,978,739
Patented Apr. 11, 1961

2,978,739

METHOD OF DEBONING COOKED POULTRY

Mark L. Goldberg, 1182 Oak Ridge Drive, Glencoe, Ill., assignor of one-third to Joseph E. Goldberg, Chicago, Ill., and one-third to Louis S. Kahn, Deerfield, Ill.

Filed Feb. 2, 1959, Ser. No. 790,528

2 Claims. (Cl. 17—45)

This invention relates to the art of deboning cooked fowl, such as chickens, ducks, turkeys or the like.

A primary object of the present invention is to devise a novel method and means for deboning such fowl without the necessity for manual handling except for the removal of the separated meat and bones.

Another object of the invention is to afford a compact, efficient fowl deboning machine of sturdy and economical construction which is capable of long life in service without the necessity of frequent cleaning or repair.

A further object of the invention is to position a grate beneath a door of a hopper and to oscillate the hopper on a pivotal axis to partially debone the fowls before they pass through the door to the grate which is oscillated rectilinearly in its own plane to completely separate the meat from the bones.

A further object of the invention is to afford a chute at the lower end of the grate to receive the bones and to afford one or more chutes beneath the grate to receive the meat.

A more specific object of the invention is to minimize the possibility of small bones becoming mixed with the meat by passing the cooked fowls first over a large mesh portion of the grate to remove the large pieces of meat before the bones begin to separate and by then passing the fowls, after they begin to disintegrate, over a small mesh portion of the grate to separate the smaller pieces of meat without permitting the separated bones to pass through the grate.

Yet another object of the invention is to mount the grate on rollers carried thereby and seated on a surface of the machine frame which has vertical guide flanges outboardly of the rollers.

Still another object of the invention is to afford a shield on the grate for covering the guide flanges and the rollers.

A different object of the invention is to adjust the time that the bones begin to separate, in a device such as above described, by adjusting oscillation of the hopper and grate for a given motor speed.

Yet another object of the invention is to connect one of the hopper and grate drive shafts to a motor and to interconnect the shafts so that they are driven in series by the motor.

The foregoing and other objects and advantages of the invention will become apparent from a consideration of the following specification and the accompanying drawings, wherein.

In each of said figures, certain details are omitted where more clearly seen in other views.

Figure 1:
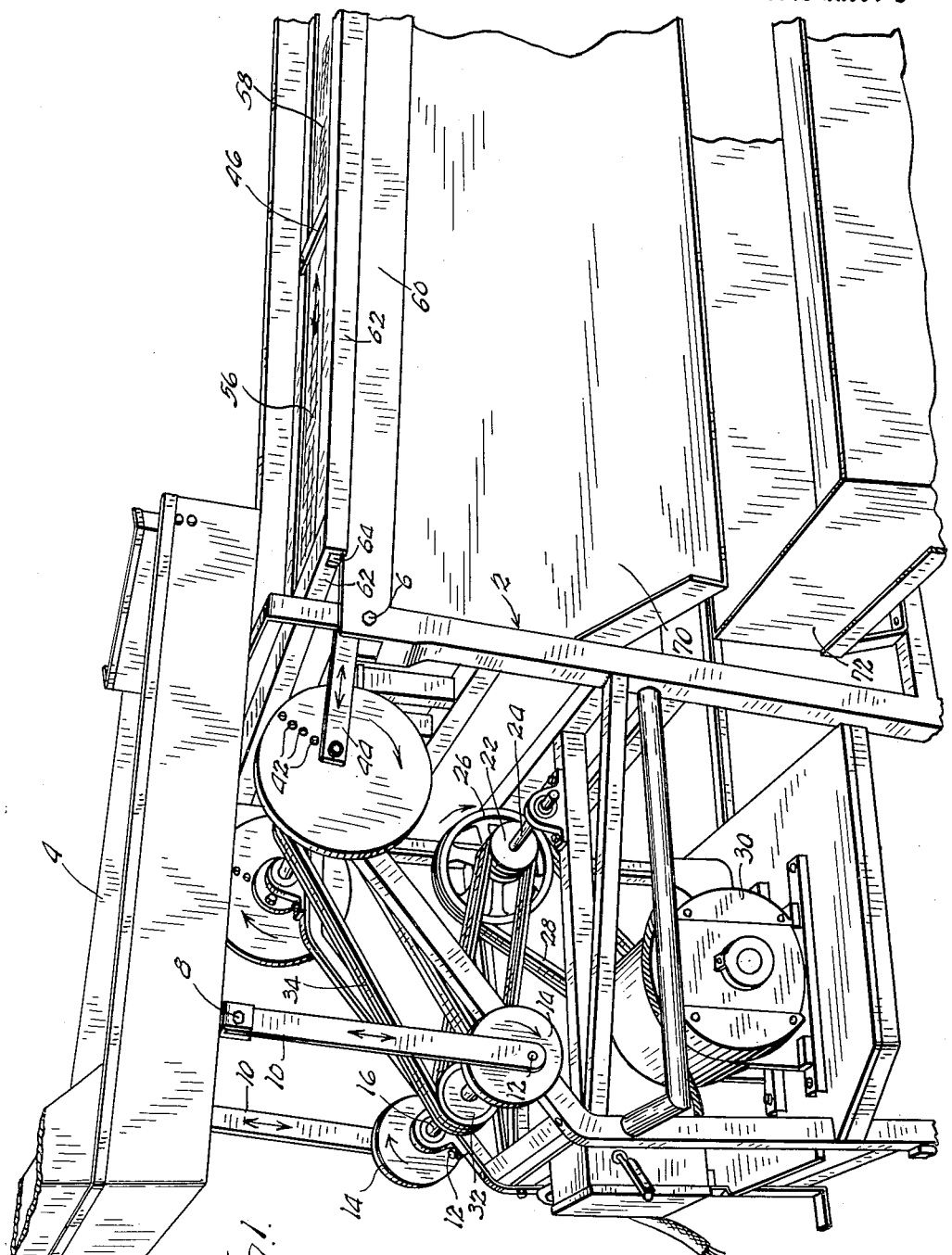
Figure 1 is a fragmentary perspective view, taken from the side and one end, of a preferred embodiment of a machine which may be utilized in the practice of the invention.

Describing the invention in detail and referring first to Figure 1, the novel deboning device comprises a frame 2 mounted on a suitable foundation (not shown).

Figure 3:
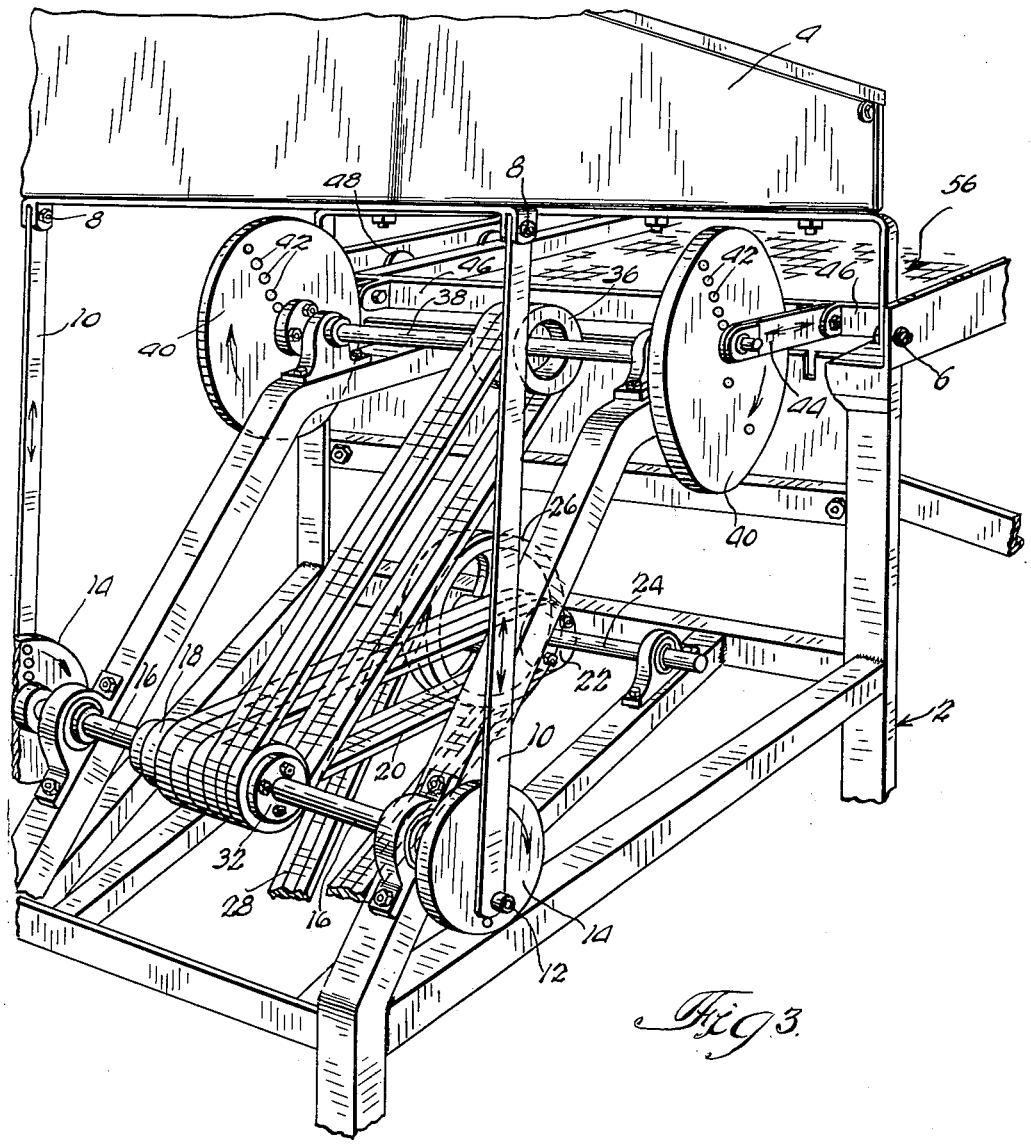
Figure 3 is a fragmentary enlarged perspective view showing in detail the oscillating means for the hopper and grate.

A hopper 4 is pivoted at 6 to the frame 2 and is pivoted at 8 to connecting rods 10 eccentrically pivoted at 12 to throws 14 of a drive shaft 16 having a pulley 18 (Fig. 3) connected by a belt 20 to a pulley 22.

The pulley 22 is keyed to a shaft 24 having a drive pulley 26 keyed thereon and connected by a drive belt 28 to an armature shaft (not shown) of a motor 30 (Fig. 1).

The shaft 16 also comprises a pulley 32 connected by a belt 34 to a pulley 36 keyed to a shaft 38 which has throws 40 keyed thereon. The throws 40 comprise openings 42 therethrough for selective attachment of connecting rods 44 so that the amount of linear travel thereof during one rotation of shaft 38 may be adjusted by preselection of desired openings 42 for connection of the connecting rods 44.

The connecting rods 44 are pivotally connected to a grate 46 having wheels or rollers 48 (Fig. 2) rollingly mounted on a horizontal surface 50 of the frame 2, said surface having an opening 54 registered with a large mesh segment 56 and a small mesh segment 58 of the grate 46 for a purpose hereinafter described.

The rollers 48 are confined between vertical webs or flanges 60 of the frame 2, and the rollers 48 are covered by angle irons 62 (Fig. 1) attached in any desired manner as by screws (not shown) to the grate 46. The rear angle iron 62 is slotted as at 64 (Fig. 1) to receive the frame flanges 60, thereby affording a compact and efficient protective casing for the rollers 48.

The hopper 4 has a doorway 66 partly defined by a plate 68 having downwardly facing teeth 69 at the top of the door 66, whereby when motor 30 is energized to oscillate the hopper 4 and grate 46, cooked chickens are dumped into the top of the hopper and gradually feed out of the door 66. Oscillation of the hopper 4 causes partial removal of the meat from the bones, particularly at the door 66 where the chicken carcasses are oscillated in contact with teeth 69. The meat and partially deboned carcasses drop from door 66 onto the large mesh segment 56 of grate 46 where violent substantially horizontal oscillation of the grate 46, in its own plane, removes still more of the meat which passes through the large mesh segment 56 of the grate down a chute 70 into a pan or receptacle 72 which when full may be removed and replaced with an empty pan 72.

By the time the carcasses pass from the large mesh segment 56 of the grate to the small mesh segments 58 thereof, the bones have begun to separate from each other and the small mesh prevents the individual bones from dropping to the chute 70.

It will be understood that the grate is almost in a horizontal plane but slopes slightly downwardly from the hopper 4 so that the carcasses and bones gradually travel from the large mesh segment 56 to the small mesh segment 58 and the meat is entirely removed from the bones which are substantially completely separated from each other on the small mesh segment 58 of the grate 46.

The carcasses and bones pass from the small mesh segment 58 of the grate into a chute 74, below which may be placed a garbage can or other container (not shown) to receive the bones which may then be disposed of for fertilizer or as refuse.

Figure 2:
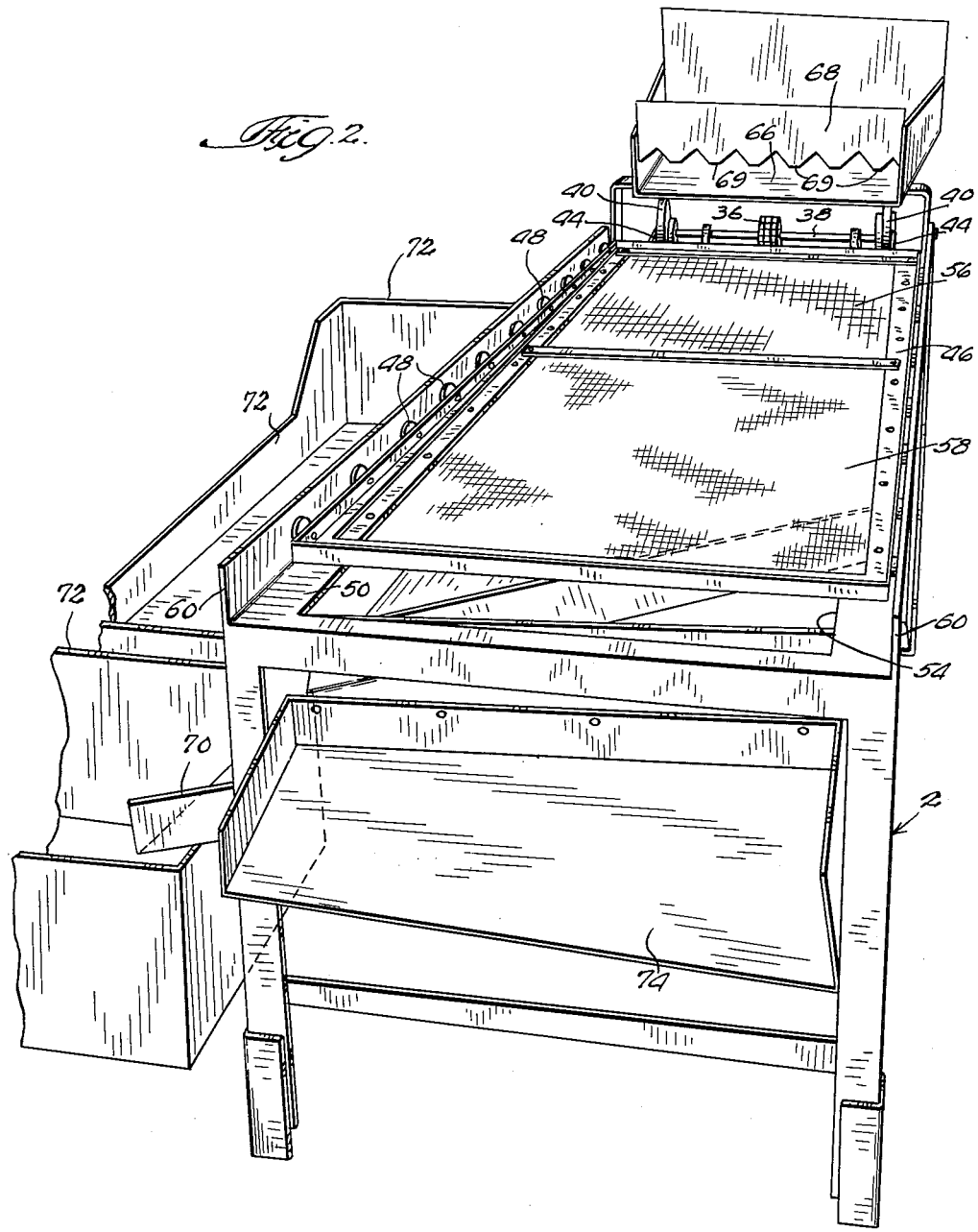
Figure 2 is a perspective view of the machine taken from the opposite end thereof.

It will be understood that separate chutes 70 and pans 72 (as shown in Fig. 2) may be aligned with the large mesh 56 and small mesh segments 58 of the grate 46 or, if desired, a single chute 70 and pan 72 may be used.

Thus it will be understood that the invention comprehends a novel method and means for separating meat and bones of cooked fowl and for minimizing the possibility of commingling of the meat and bones. As heretoofre described, the amount of grate oscillation per motor revolution may be quickly and conveniently adjusted for each batch of cooked fowl, so that the fowl will pass to the small mesh segment of the grate before the bones begin to separate to such an extent that the smaller bones might pass through the large mesh segment of the grate.

An important feature of the invention is the manner in which the grate is rollingly supported on the frame and is oscillated rectilinearly in its own plane which is slightly tilted with respect to the horizontal so that the bones pass into a chute at the lower end of the grate and the meat passes through the grate into one or more chutes positioned beneath the grate.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A method of deboning cooked fowl comprising the steps of agitating said cooked fowl carcasses in an agitation zone to induce a partial separation and removal of the cooked meat from the bones, then conducting said carcasses to a second zone, then subjecting said fowl carcasses to further agitation and succession until the meat is completely separated from the bones, then removing the separated bones.

2. A method of deboning cooked fowl comprising the steps of agitating said cooked fowl carcasses in an agitation zone to induce a partial separation and removal of the cooked meat from the bones, then gradually conducting said carcasses to a second zone, then subjecting said carcasses to further agitation and succession until additional separation of meat and bones occurs, then conducting the carcasses to a third zone and violently agitating said carcasses until there is complete separation of the meat from the bones, and then removing said bones.

References Cited in the file of this patent

UNITED STATES PATENTS

| | | |
|---|---|---|
| 639,710 | Cherry | Dec. 26, 1899 |
| 2,734,537 | Geisler | Feb. 14, 1956 |
| 2,761,479 | Geisler et al. | Sept. 4, 1956 |

FOREIGN PATENTS

| | | |
|---|---|---|
| 694,449 | France | Sept. 16, 1930 |